US008037313B2

(12) United States Patent
Hämäläinen et al.

(10) Patent No.: US 8,037,313 B2
(45) Date of Patent: Oct. 11, 2011

(54) METHOD AND ARRANGEMENT FOR REAL-TIME BETTING WITH AN OFF-LINE TERMINAL

(75) Inventors: Panu Hämäläinen, Tampere (FI); Marko Hännikäinen, Pirkkala (FI); Timo D. Hämäläinen, Kangasala (FI)

(73) Assignee: Innoka Oy, Vantaa (FI)

( * ) Notice: Subject to any disclaimer, the term of this patent is extended or adjusted under 35 U.S.C. 154(b) by 832 days.

(21) Appl. No.: 10/584,977

(22) PCT Filed: Dec. 28, 2004

(86) PCT No.: PCT/FI2004/000803
§ 371 (c)(1),
(2), (4) Date: Jul. 17, 2009

(87) PCT Pub. No.: WO2005/064506
PCT Pub. Date: Jul. 14, 2005

(65) Prior Publication Data
US 2009/0300363 A1    Dec. 3, 2009

(30) Foreign Application Priority Data
Dec. 29, 2003  (FI) .................................... 20031909

(51) Int. Cl.
*H04L 29/00* (2006.01)
(52) U.S. Cl. ......................................... 713/178; 436/25
(58) Field of Classification Search .................. 713/178; 436/25
See application file for complete search history.

(56) References Cited

U.S. PATENT DOCUMENTS

| 5,871,398 A | 2/1999 | Schneier et al. |
| 2002/0111855 A1 * | 8/2002 | Hammerstad .................. 705/14 |
| 2003/0023853 A1 | 1/2003 | Wajs |
| 2004/0015442 A1 * | 1/2004 | Hamalainen et al. .......... 705/50 |

FOREIGN PATENT DOCUMENTS

| WO | WO 02/27674 | 4/2002 |
| WO | WO 2004/036396 | 4/2004 |

OTHER PUBLICATIONS

"Offline Architecture for Real-Time Betting;" P. Hamalainen, et al; IEEE International Conference on Multimedia 7 Expo (ICME 2003), Baltimore, USA, Jul. 6-9, 2003.

* cited by examiner

*Primary Examiner* — Vivek Srivastava
*Assistant Examiner* — Anthony Brown
(74) *Attorney, Agent, or Firm* — Sullivan & Worcester LLP; Christopher T. McWhinney

(57) ABSTRACT

The invention relates generally to a method and arrangement for real-time betting with an off-line terminal, and especially to the technological field of keeping reliable time in the off-line terminal when handling, within a communications system comprising a distributed domain and a central domain, electronic records that contain predictions of the outcome of a certain incident. Within the distributed domain a multitude of electronic records that contain predictions of the outcome of the incident are generated and furnished with a cryptographically protected proof of a certain moment of the distributed domain's local time associated with the generation of the electronic record.

38 Claims, 5 Drawing Sheets

US 8,037,313 B2

METHOD AND ARRANGEMENT FOR REAL-TIME BETTING WITH AN OFF-LINE TERMINAL

CROSS REFERENCE TO RELATED APPLICATIONS

This application is for entry into the U.S. national phase under §371 for International Application No. PCT/FI04/000803 having an international filing date of Dec. 28, 2004, and from which priority is claimed under all applicable sections of Title 35 of the United States Code including, but not limited to, Sections 120, 363 and 365(c), and which in turn claims priority under 35 USC §119 to Finnish Patent Application No. 20031909 filed on Dec. 29, 2003.

TECHNICAL FIELD OF THE INVENTION

The invention relates generally to a method and arrangement for real-time betting with an off-line terminal. Especially the invention relates to the technological field of keeping reliable time in the off-line betting terminal.

BACKGROUND OF THE INVENTION

Betting can be generally defined as an activity where a number of participants try to predict the outcome of a certain well-defined incident, such as e.g. a sports event, an election or simply the arbitrary drawing of a small group of numbers or other symbols (in the latter case the terms "lotto" or "lottery" are more commonly used than "betting"). Typically placing a bet means putting down a certain sum of money or other commodity of value, so that those who succeeded in predicting the outcome of the incident in question get their investment back with a certain profit that is financed from the collected stakes of the unsuccessful participants. An important feature of betting is that all bets must be placed before a certain time instant after which it would be possible to know the result or anticipate it with an increased level of certainty.

In a manual betting system where all bets must be placed before an officer of the organiser of the game it is easy to take care of the timing aspects of betting. The organiser which accepts the bets closes at the moment after which no more bets are accepted, and opens again for paying the profits after the outcome of the incident is known. In electronic betting arrangements the situation is somewhat more complicated.

A feature common to typical known electronic betting systems is their relative slowness in receiving bets. Large betting systems must accept even tens of millions of bets concerning a single incident. Even when very fast communications and storage technology are used, there exists a limit for the rate at which the bets can be communicated and stored into the central database. This feature has limited the applicability of the whole principle of betting so that the incidents the results of which are objects of betting are themselves rather large and long lasting, like a complete football game or a complete horse race.

A solution for above mentioned drawbacks is described for example in prior art document WO 02/27674, where electronic records that contain predictions of the outcome of a certain incident are handled within a communications system comprising a distributed domain and a central domain. Within the distributed domain there is generated, before the outcome of the incident is known, a multitude of electronic records that contain predictions of the outcome of the incident. The electronic records are conveyed from the distributed domain to the central domain. After the outcome of the incident is known, the central domain finds out which of the electronic records, if any, contain correct predictions of the outcome of the incident. Each of the electronic records is furnished, within the distributed domain, with a cryptographically protected proof of a certain moment of time associated with the generation of the electronic record. The central domain accepts only those of the electronic records conveyed thereto as valid for which the cryptographically protected proof of a certain moment of time associated with the generation of the electronic record shows that said certain moment of time was not later in time than a certain time limit.

In prior art methods the clock signal used for time-stamping bet records are generated either internally by the distributed domain or externally by another party. An exemplary prior art method is illustrated in FIG. 1, where clock signal, either internally or externally produced, is used for generating time-stamped bet records. In FIG. 1 a unidirectional algorithm is used to convert the actual contents of the bet and the clock signal into a bet record that is authenticated by encrypting it with a private key of the player placing the bet and encrypted with the public key of the organiser. As a part of the conversion a checksum is calculated and added into the bet record. The result is an authenticated, encrypted and time-stamped bet record that can only be decrypted with the private key of the organiser. The authentication based on the player's private key can only be reversed with the same player's public key.

There are, however, some drawbacks also in prior art solution mentioned above, namely, the integrity of the used clock signal. The internal clock signal may be fingered, and it is difficult to know within the central domain if the clock signal of distributed domain is fingered or not. Further, the externally produced clock signal may be stolen, caught or seized before reached on the distributed domain and re-sent a moment later to the distributed domain, for example. In addition the externally produced clock signal may be fingered, especially if its protection can be cracked.

SUMMARY OF THE INVENTION

An object of the invention is to enable a secure offline real-time betting system. Specifically an object of the invention is to keep reliable time in a hostile environment, such as an off-line terminal, without communicating upstream, such as to a game organiser, during the game. An additional object of the invention is to store bet records reliably with cryptographic time-stamps in a hostile environment using reliable local time of the hostile environment to time-stamp the bet records without communicating upstream during a game.

The objects of the invention are achieved by using an off-line terminal for betting so that local time of the off-line terminal is synchronised at first corresponding to local time of an organiser by help of at least two of first separately broadcasted information packets, called beacon tick packet, received by the off-line terminal and values of a free running counter within the off-line terminal. In addition the object of the invention is achieved by using a second broadcasted information packets, called watchdog tick packet, comprising time information of a local time of the organiser, for verifying validity of local time of the off-line terminal. More specifically the objects of the invention are achieved by a method according to claim 1, a computer program product according to claims 14 and 15, a terminal according to claim 16, an organiser server according to claim 31, and an arrangement according to claim 34 and a circuit means according to claim 38. Further the additional object of the invention can be achieved according to additional features described in dependent claims.

The invention relates to a method for real-time betting, within a communications system comprising a distributed domain and central domain, by handling electronic records that contain predictions of the outcome of a certain incident, comprising the steps of:
  generating, within the distributed domain, a multitude of electronic records that contain predictions of the outcome of the incident, according to a players' inputs,
  furnishing, within the distributed domain, each of the electronic records with a cryptographically protected proof of a certain moment of a distributed domain time associated with the generation of the electronic record,
which is characterized in that the method further comprises the steps of:
  receiving, within the distributed domain, repetitive beacon tick packets and watchdog tick packets, comprising time information of a local time of the central domain at the moment the packet was sent,
  synchronising local time of the distributed domain, with time equated with the central domain time information received by the beacon tick packets, by help of values of a counter in the distributed domain and time information in received beacon tick packets, and
  verifying validity of local time of the distributed domain regarding to the central domain's local time by comparing local time of the distributed domain to time information relating to the local time of the central domain received by the watchdog tick packets.

The invention relates also to a computer program product directly loadable into the internal memory of a digital computer, which is characterised in that the computer program product comprises software code portions for performing the steps of the above method when said product is run on a computer.

Further the invention relates to a computer program product stored on a computer usable medium, which characterised in that the computer program product comprises computer readable program means for causing a computer to perform the steps of the above method when said product is run on a computer.

Further the invention relates to a terminal for real-time betting, within a communications system comprising a distributed domain and a central domain, where the terminal belongs to the distributed domain, by handling electronic records that contain predictions of the outcome of a certain incident, is arranged to:
  generate, within the distributed domain, an electronic record that contains a prediction of the outcome of the incident, according to a player's input,
  furnish, within the distributed domain, the electronic record with a cryptographically protected proof of a certain moment of a distributed domain time associated with the generation of the electronic record,
which is characterized in that the terminal is further arranged to:
  receive, within the distributed domain, repetitive beacon tick packets and watchdog tick packets, comprising time information of a local time of the central domain at the moment the packet was sent,
  synchronise a local time of the distributed domain, with time equated with the central domain time information received by the beacon tick packets, by help of values of a counter in the distributed domain and time information in received beacon tick packets, and
  verify validity of local time of the distributed domain regarding to the central domain's local time by comparing local time of the distributed domain to time information relating to the local time of the central domain received by the watchdog tick packets.

Further the invention relates also to an organiser server for real-time betting, within a communications system comprising a distributed domain and a central domain, where the organiser server belongs to the central domain, by handling electronic records that contain predictions of the outcome of a certain incident, is arranged to:
  receive from the distributed domain a multitude of electronic records that contain predictions of the outcome of the incident and,
  process for finding out, after the outcome of the incident is known, which of the electronic records, if any, contain correct predictions of the outcome of the incident,
which is characterized in that the organiser server is further arranged to:
  send repetitive beacon tick packets and watchdog tick packets, comprising time information of a local time of the central domain at the moment the packet was sent, to the distributed domain, in order that within the distributed domain a local time of the distributed domain is synchronised with time equated with the central domain time information received by the beacon tick packets, by help of values of a counter in the distributed domain and time information in received beacon tick packets, and
  verify validity of local time of the distributed domain regarding to the central domain's local time by comparing local time of the distributed domain to time information relating to the local time of the central domain received by the watchdog tick packets.

Further the invention relates to an arrangement for real-time betting, comprising a distributed domain and a central domain, by handling electronic records that contain predictions of the outcome of a certain incident, is arranged to:
  generate, within the distributed domain, a multitude of electronic records that contain predictions of the outcome of the incident, according to a players' inputs,
  furnish, within the distributed domain, each of the electronic records with a cryptographically protected proof of a certain moment of a distributed domain time associated with the generation of the electronic record,
which is characterized in that the arrangement is further arranged to:
  receive, within the distributed domain, repetitive beacon tick packets and watchdog tick packets, comprising time information of a local time of the central domain at the moment the packet was sent,
  synchronise a local time of the distributed domain, with time equated with the central domain time information received by the beacon tick packets, by help of values of a counter in the distributed domain and time information in received beacon tick packets, and
  verify validity of local time of the distributed domain regarding to the central domain's local time by comparing local time of the distributed domain to time information relating to the local time of the central domain received by the watchdog tick packets.

Furthermore the invention relates to a circuit means for real-time betting, within a communications system comprising a distributed domain and a central domain, where the circuit means belongs to the distributed domain, by handling electronic records that contain predictions of the outcome of a certain incident, is arranged to:

generate, within the distributed domain, an electronic record that contains a prediction of the outcome of the incident, according to a player's input, furnish, within the distributed domain, the electronic record with a cryptographically protected proof of a certain moment of a distributed domain time associated with the generation of the electronic record, which is characterized in that the circuit means is further arranged to:

receive, within the distributed domain, repetitive beacon tick packets and watchdog tick packets, comprising time information of a local time of the central domain at the moment the packet was sent, synchronise a local time of the distributed domain, with time equated with the central domain time information received by the beacon tick packets, by help of values of a counter in the distributed domain and time information in received beacon tick packets, and verify validity of local time of the distributed domain regarding to the central domain's local time by comparing local time of the distributed domain to time information relating to the local time of the central domain received by the watchdog tick packets.

The following notions are used in this application:

"Beacon tick" is protected information packet broadcasted to a distribution domain advantageously regularly, comprising for example time information, such as delay information of next coming beacon tick and central domain (organiser's server) local time, or more precisely central domain's (organiser's server) time-stamp of a moment the beacon tick was sent from the central domain. The delay information is, however, optional, especially in a case, where beacon tick packets are broadcasted by constant time interval. Further the beacon tick comprises security parameters, digital signature and possible message authentication code. Beacon ticks received by the distributed domain are used for synchronising local time of the distributed domain by help of a free running counter within the distributed domain. Beacon tick packets may be broadcasted from the central domain, or from another reliably and authorized party, such as Digital Audio Broadcasting transmitter arrangement or Digital Video Broadcasting transmitter arrangement. The beacon tick packet broadcasting process is typically of point-to-multipoint type.

"Bet end packet" is information packet comprising information data regarding a betting incident, game data, such as targets, rates and options, time information (clock time-stamp of a moment the bet end packet was sent from the central domain), security parameters and authentication code, for example. Especially a player is announced with the bet end packet that a certain individual betting incident has ended and the players are not allowed to place bets longer. Alternatively the bet end packet may comprise an ending time, which means the moment after which the placing of bets is no longer possible. The bet end packet broadcasting process is typically of point-to-multipoint type.

"Bet start packet" is information packet comprising data regarding a betting incident, game data, such as targets, rates and options, time information (clock time-stamp of a moment the bet start packet was sent from the central domain), security parameters and authentication code. Especially a player is announced with the bet start packet that a certain individual betting incident has begun and the players may start placing bets. Alternatively the bet start packet may comprise a starting time, which means the moment after which the placing of bets is allowed. The bet start packet broadcasting process is typically of point-to-multipoint type.

"Broadcaster" can be considered as a network means acting as a channel of information exchange between a distributed domain or a terminal and a central domain or an organiser (technically organiser's server). The broadcaster is, for example, a Digital Audio Broadcasting transmitter or Digital Video Broadcasting transmitter arrangement. According to an embodiment of the invention the broadcaster may also act as a broadcaster of beacon tick packets, but this is, however, an optional feature of the invention. In addition, according to another embodiment of the invention the broadcaster may be a trusted party which is well aware of local time of the central domain and the broadcaster can time-stamp data packets it broadcasts with local time of the central domain, but again the trusted party feature is an optional feature of the invention and it is not required according to the best mode of the invention.

"Central domain" is separated domain from a distributed domain, and the central domain may be considered as a reliable environment. The central domain's local time is legal time in the betting environment according to the invention. An organiser and organiser's server, for example, belong to the central domain.

"Distributed domain" is separated environment from a central domain, and the distributed domain may be considered as a hostile environment. Players and terminals belong to the distributed domain.

"Organiser" maintains games, i.e. controls an opening and closing of bets, collects the bets, calculates profits according to the outcome of the incident which was the object of betting, and arranges the distribution of stakes, for example by updating accounts of players, so that the winning players can collect their profits and the losing players lose their stakes. Organiser may be imagined technically as a server within the central domain, which is at least partly implemented by a software means, and thereby a term of organiser server is also used in this document.

"Terminal" or an off-line terminal is a device belonging to a distributed domain, by which players can take part in a betting process, such as receive bet start/end packets and send their bets to a central domain. Off-line terminal (or betting) means that the off-line terminal can take place at any time before or after the closing time even without two-way connection during the game. Here the closing time is the moment, when the organiser closes the betting. This could be for example a moment after which the outcome of the incident is either known or possible to anticipate with an increased level of certainty.

"Time" relating to local time of a domain (either central domain, organiser's server, and/or distributed domain or terminal), means in this document an electric signal relating to local time, which can be used for time-stamping of information packets, such as beacon tick, watchdog tick, bet start/end packets, bet records, and results.

"Watchdog" is an arrangement in a terminal belonging to a distributed domain, which is liable for legally operation of the terminal. Watchdog is most advantageously implemented by a software means, but according to an embodiment of the invention it can be implemented also, at least partly, by a hardware means. The watchdog also requires according to an embodiment of the invention a new cryptographic key or suchlike data packet to be supplied to it according to a predefined time schedule, so that a missing or wrong key or other data packet interrupts the operation of the watchdog, which in turn makes it impossible to compose, time-stamp and/or transmit any more bet records. This is what it meant by the watchdog: if it is not functioning properly, the whole betting application or at least an essential part of it must fail in the terminal arrangement. The keys or suchlike data packets to the watchdog come most advantageously through transmissions from the network; they can come for example from the organiser's server but this it not a requirement of the invention.

"Watchdog tick" is protected information packet broadcasted to a distributed domain, comprising at least central domain's (organiser's server) local time (or more precisely central domain's (organiser's server) time-stamp of a moment the watchdog tick was sent from the central domain). According to an advantageous embodiment of the invention the watchdog tick packets are broadcasted by constant time interval. However, it is optional, that the watchdog tick packets are broadcasted repetitive and by non-constant time interval, whereupon it is advantageous that the watchdog tick packets comprise also information of delay to the next watchdog tick to be broadcasted to the distributed domain. Further the watchdog tick packets may comprise security parameters, such as watchdog key updates, digital signatures and message authentication code, and also a field telling whether the game is just going, just beginning or closed, and whether the player may join the game. Watchdog tick may comprise also information of permissible delay or time interval during which the next watchdog tick must be received to be accepted. Watchdog ticks are used mainly for verifying validity of local time of the distributed domain, and they are broadcasted most advantageously from the central domain.

The electronic betting environment according to an exemplary embodiment of the present invention comprises a distributed domain, central domain, and a network acting as a channel of information exchange between the distributed domain or terminals therein, and the central domain or an organiser and server means therein. Actually the "network" concept reaches both to the distributed domain and to the central domain, because each terminal that is used for betting constitutes a terminal node in the network, and the system of the organiser constitutes a central node in the network. Due to the large number of terminals and the small number of organiser's system nodes the network resembles a tree-like structure where the root of the tree is at the organiser's system node(s) and numerous branches are directed therefrom towards the players' terminals. Further, the electronic betting environment comprises also a broadcaster, which maintains the network and especially information traffic in the network, and broadcasts for example bet start/end packets and watchdog tick packets from the central domain to the terminals. Moreover the broadcaster broadcasts beacon tick packets to the terminals of the distributed domain.

According to an exemplary embodiment of the present invention information traffic between the central domain and terminals is encrypted. Encryption is implemented for example using disposable keys by the central and distributed domain. The central domain may at the beginning, when the player and/or the used terminal have been authenticated, deliver initial key material to the terminal via two-way network link or alternatively by sending a session start packet via the broadcaster, where the session start packet is individualised to a certain terminal. After this the terminal may encrypt data, such as bet records, to be stored in a memory means of the terminal or to be delivered to the central domain via the network. The central domain typically sends new key update in every information packet broadcasted to the terminal, and the used or outdated keys are deleted. It is also typical, but not required, to the present invention that when receiving, sending or storing information the terminal chains the used key and data or data comprising time information relating to the event, encrypts data with chained key and data or data comprising time information and stores encrypted data to its memory means for later collection or other use.

When the terminal receives the bet start packet after the session start packet, it shows the content of the bet packet to the player to place his/her bet. The bet start packet typically comprises identification data of the incident, game data, time information, security parameters, and message authentication code. An electronic record is then generated from the player's input (bet) and identification information (ID) relating to the players' input (bet) and furnished with a cryptographically protected proof of a certain moment of terminal time associated with the generation of the electronic record. The used time is a local time of the terminal. The information relating to local time of the terminal is advantageously chained and stored with the data of an event, for example, when receiving initial key materials, watchdog tick packets and bet start and end packets.

According to an exemplary embodiment of the present invention local time of the terminal used in the generation of the electronic bets is kept reliable and in time partly by externally generated first and second kinds of data packets broadcasted to the terminal. Before betting, the clock signal of the terminal is synchronised with time equated with the central domain's local time by broadcasting first kind of data packets, called beacon tick packets, to the terminal to use beacon tick packets for synchronising process, which is clarified next in more details.

The terminal of the distributed domain comprises also a (at least one) free running counter, advantageously an independent free running counter, whereupon when receiving beacon tick packets broadcasted by a predetermined time interval, the terminal reads in the synchronising process a value of the free running counter at a moment of receiving beacon ticks. After this the terminal sends a request to the central domain to send a response to the terminal to indicate accurate central domain's local time at the moment of receiving the request and at the moment of sending the response, and creates a conversion (or in other words, mapping) factor proportional to the interval of the received beacon ticks and to the values of the free running counter. Also a local clock of the terminal is initialised. When the terminal receives the response from the central domain and read a value of the free running counter at a moment of receiving the response, the terminal constructs a clock offset by help of the mapping factor and values of the free running counter and central domain time information received in the response, and adjusts the terminal's local time essentially to time equated with the central domain's local time by help of the constructed clock offset.

The terminal is also arranged to receive second kind of data packets called watchdog ticks to use them to verify validity of the terminal's local time regarding the central domain's local time by comparing local time of the terminal to time information of the central domain received by the watchdog tick packet. Watchdog tick packets may also comprise delay information of the next coming watchdog tick packet, and delay of next coming watchdog tick packet is verified at the moment of receiving it whether it is received at right time. If watchdog tick packet is not received at right time, betting process may be stopped in the terminal and no more, or even none of bets placed in the terminal are allowed. Alternatively one or more missed watchdog tick packets may be accepted and the terminal local time may be tried to synchronize, but if a certain numbers of watchdog tick packet is missed, the betting process is stopped in the terminal and no more, or even none of bets placed in the terminal are allowed. Also the player and organiser may be alerted, and information of the (alert) event stored.

It should be noted that the synchronising process is typically continuous process in the background being invisible to the player, whereupon the beacon ticks are also broadcasted continuously to the terminal. According to an advantageous embodiment of the invention the betting environment may be divided to four layers in virtually, where the first layer associates with the central domain and its events and features. One of the most fundamentally feature of the central domain (first layer) is that central domain local time is the most legal time of the whole betting environment. The second layer associates with a user interface in the terminal (distributed domain), such as provides a user display time, which by nature is insecure. The third layer associates with a secured local time within the terminal. Further the fourth layer associates with the most protected event of the terminal, such as independent free running counter(s). The terminal advantageously comprises at least two counters, where the first counter is associated with layer four events only (for internal log of events), and the second counter for time service of layer three. The rates of the counters are independent from each other, but it is required that the rates are essentially constant. The nature of layers of the betting environment is discussed in greater detail with the drawings and descriptions of the drawings.

Before the betting process, a bet record storage, which typically locates in a memory means of the terminal in the distributed domain, is initialised. The bet record storage may be initialised for example with initial data comprising value of the free running counter(s) of the terminal at the moment of initialisation, mapping factor proportional to the interval of the received beacon ticks and to the values of the free running counter generated in the synchronisation process, and clock offset. The aim of the initialisation of the bet record storage is to generate the bet record storage comprising starting values for chaining the next records.

The used broadcast parameters are also conveyed between the terminal and central domain at least before the betting process starts. The broadcast parameters may be changed advantageously also during a game, whereupon the new broadcast parameters are conveyed to the terminal, for example within bet packets, beacon tick and watchdog tick packets. The broadcast parameters may inform the terminal of used source from where the beacon tick packets are broadcasted (organiser's server or broadcaster, for example), and used frequency, channel, and bit pattern in a frame.

BRIEF DESCRIPTION OF THE DRAWINGS

Next the invention will be described in greater detail with reference to exemplary embodiments in accordance with the accompanying drawings, in which.

DETAILED DESCRIPTION

Figure 1:
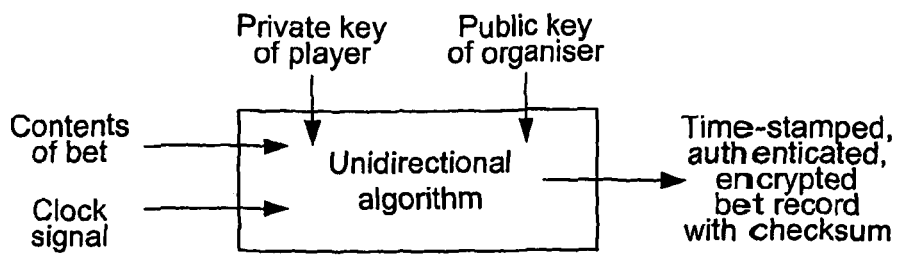
FIG. 1 illustrates an art method for real-time betting with an off-line terminal.

FIG. 1 has already been discussed above in connection with the description of the prior art.

Figure 2:
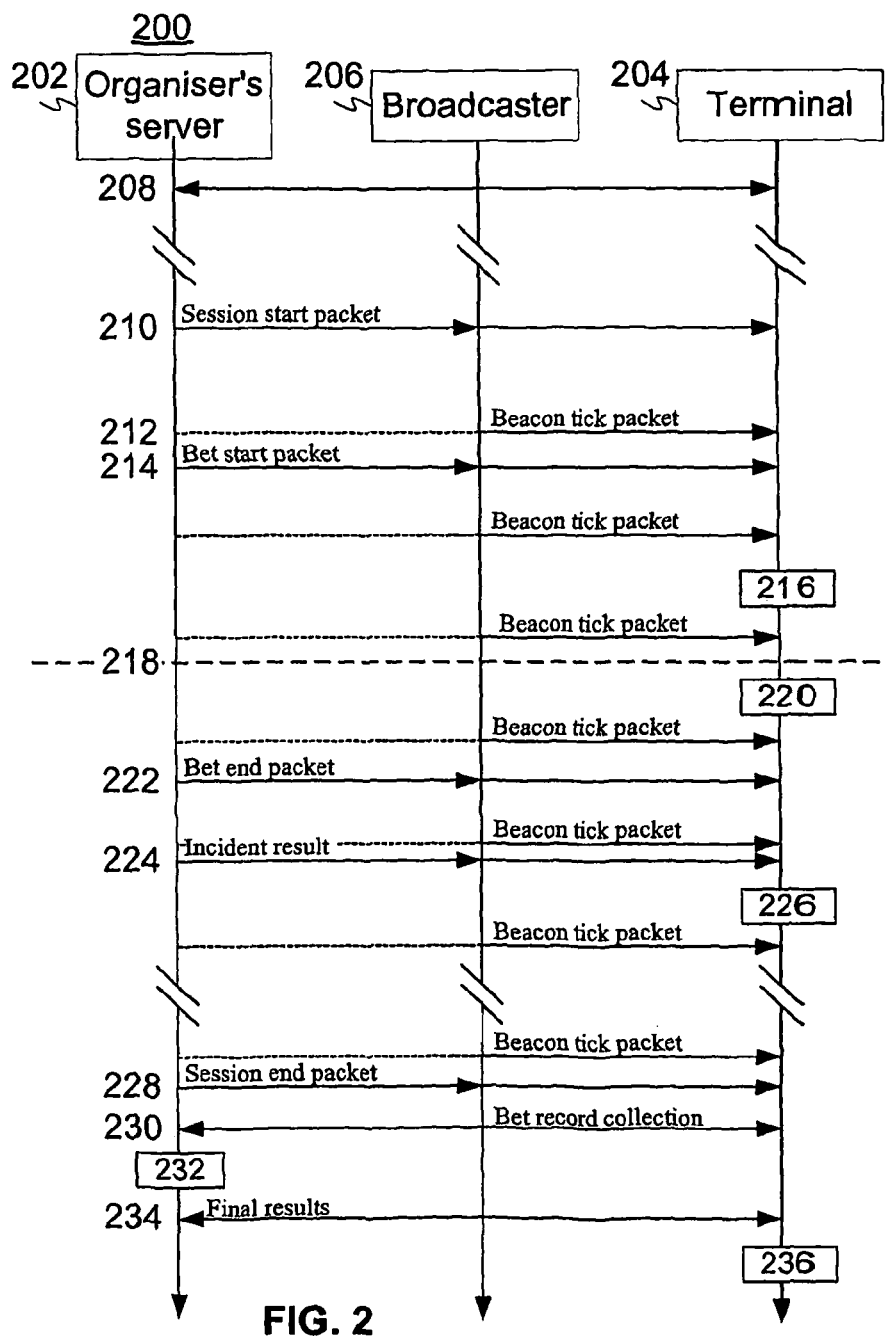
FIG. 2 illustrates an exemplary communication environment for real-time betting between a central domain and an off-line terminal according to an advantageous embodiment of the present invention.

FIG. 2 illustrates as a chart a simplified exemplary communication method 200 and environment for real-time betting between an organiser or a central domain 202 and an off-line terminal belonging to a distributed domain 204 through a network advantageously administered or implemented by a broadcaster 206 according to an advantageous embodiment of the present invention. The communication between the parties in FIG. 2 is discussed in more details in connection with FIGS. 3, 4 and 5.

Before betting processes the organiser at the central domain 202 may preliminarily broadcast, for example, announcements relating to games to be played to the terminals 204 at step 208, whereupon players can browse and choose the games to which they want to take part by registering themselves in the betting system of the organiser. Alternatively the player may send a request via two-way network to the central domain at step 208 to get a game list, for example. The registering is advantageously implemented with the terminal by sending at least identification data of the player and/or terminal and the games to be played. At the step 208 both the player (terminal) and the organiser must authenticate themselves to the other party so that secure communications connections may be set up therebetween later. Authentication means in this context that the true identity of both the original transmitter and the final receiver are known. In connection with step 208 the organiser may also set up a user account for the player. Financial transactions, such as crediting and debiting, between the organiser and the player are however not discussed in this document in more details. Further the time of the local of the terminal is synchronised at step 208 according to an exemplary embodiment of the invention.

The player may also send a request at step 208 to join a game. Advantageously the watchdog tick packet may comprise information, whether the game is just going, beginning, or closed and whether is it possible to join still the game.

At step 210 the organiser may announce the next occasion of a betting game or a number of betting games by broadcasting a session start packet to the terminal. The session start packet, such as also the previously discussed announcement, is a broadcast message of point-to-multipoint type, so basically it can be made either as a general packet broadcasting in the packet-switched network or through the digital broadcasting network. The session start packet of step 210 comprises general information regarding the oncoming (number of) betting game(s), such as event identification information. In addition the session start packet comprises also time information of local time of the organiser (central domain), used security parameters and authentication code. The local time of the terminal is synchronised at step 212 by help of information of the received beacon tick packet.

The beacon tick packets used for synchronising local time of the terminal and keeping it in time during the betting game can be broadcasted solely by the authorized broadcaster (solid line), which is aware of exact time of the organiser (central domain), or alternatively the organiser may broadcast the beacon ticks (dashed line) to the terminal(s) over the broadcaster. The synchronising process is explained in more detail later in this document.

When the player has registered himself to taking part to betting, a bet start packet is broadcasted at step 214 to player's terminal. The bet start packet comprises information regarding the betting incident, game data, such as targets, rates and options, timing information, security parameters and authentication code. Especially the player is announced with the bet start packet that a certain individual betting incident has begun and the players may start placing bets. Alternatively the bet start packet may comprise a starting time, which means the moment after which the placing of bets is allowed. The bet start packet broadcasting process is again of point-to-multipoint type.

After receiving the bet start packet the terminal displays its content to the player so that the player can place his bet at step 216, whereupon the terminal (within the distributed domain) generates an electronic record, that contain predictions of the outcome of the incident (player's bet), and where the electronic record is time-stamped or more precisely furnished with a cryptographically protected proof of a certain moment of the terminal (distributed domain) time associated with the generation of the electronic record. The cryptographically protected proof of a certain moment is advantageously electric clock signal representing local time of the terminal. Alternatively, according to another advantageous method of the present invention, the electronic record is furnished ("time-stamped") with a cryptographically protected proof of value of a free running counter(s) of the terminal at the certain moment associated with the generation of the electronic record, where the value used to "time-stamping" are unambiguously connectable to the terminal local time synchronised with the organiser's local time.

At some later time the incident the outcome of which was the object of betting is over, and the outcome becomes known, which means that it is not reasonable to allow players to place bets anymore. In practise the organiser closes betting before the outcome becomes known. The moment after which it must be impossible to place valid bets is presented by dashed line 218 as the actual closing time. For the sake of example it is shown also the attempted placing of a bet at step 220, which is after the actual closing time. The organiser broadcasts an announcement of the end of betting at step 222 by a bet end packet. However, the concept of guard period is applied, so the moment of transmitting the message of step 222 is not decisive: the time for placing valid bets ended at moment 218. The invention does not require a guard period to be used, and the invention allows the guard period to have even a different sign than that shown in FIG. 2. The latter means that the time for placing valid bets may even continue after the delivery of the message of step 222, so that the message of closing time comes first and the actual closing time only thereafter.

The reception at the player's terminal of the message that indicates that no more bets are allowed should immediately disable the terminal arrangement from generating any more such bet records related to the closed betting game that could under any conditions be interpreted as having been validly time-stamped. This should happen regardless of the reading or even availability of a local real time clock signal in the terminal at the moment of receiving the message.

After the bet end packet an incident result packet, comprising for example identification data of the incident, result, time information, security parameters and message authentication code, is broadcasted at step 224 to the terminal. The incident result packet is typically encrypted, whereupon the outcome is calculated in the terminal at step 226 and shown to the player. Betting can be continued furthermore broadcasting new bet start packets to player's terminal, such as illustrated at step 214, until the organiser sends a session end packet at step 228 to the terminal(s), whereupon the game session will be closed. The session end packet typically comprises information of event identification, timing information, security parameters, and message authentication code. Again the time for placing valid bets (session) may even continue after the delivery of the message of step 228, so that the message of closing time of the session comes first and the actual closing time only thereafter.

According to the principle of off-line electronic betting the terminal of the invention does not need to transmit the time-stamped bet record to the organiser immediately (although the invention does not prevent him/her from doing so), but the time-stamped bet records can be stored in a bet record storage of the terminal and transmitted or collected afterwards, as at step 230 in FIG. 2. After the time-stamped bet records has been collected, the organiser checks all received, time-stamped bet records to make sure that it has received complete reports from all those terminals that were registered to the game earlier at step 208. If the deadline expires without a complete report having been received from a certain player, the organiser may freeze the user account of that player and prevent the player from accessing the betting system again. The bet placed at step 220 is rejected at the latest at step 232 when it's time stamp is checked, because it has been placed after the organiser has closed betting at step 218. Alternatively the terminal may already reject the bet placed at step 220 before bet record collection. At step 232 the player's accounts are also updated. At the end of the betting session final results are changed between the organiser and terminal at step 234, and final report is shown to the player with the terminal at step 236.

It should be noticed from FIG. 2 that during the game (between session start and end events) the information traffic between the central domain and the terminal is only one-way and especially from central domain to the terminal being characteristic to the present invention.

Figure 3:
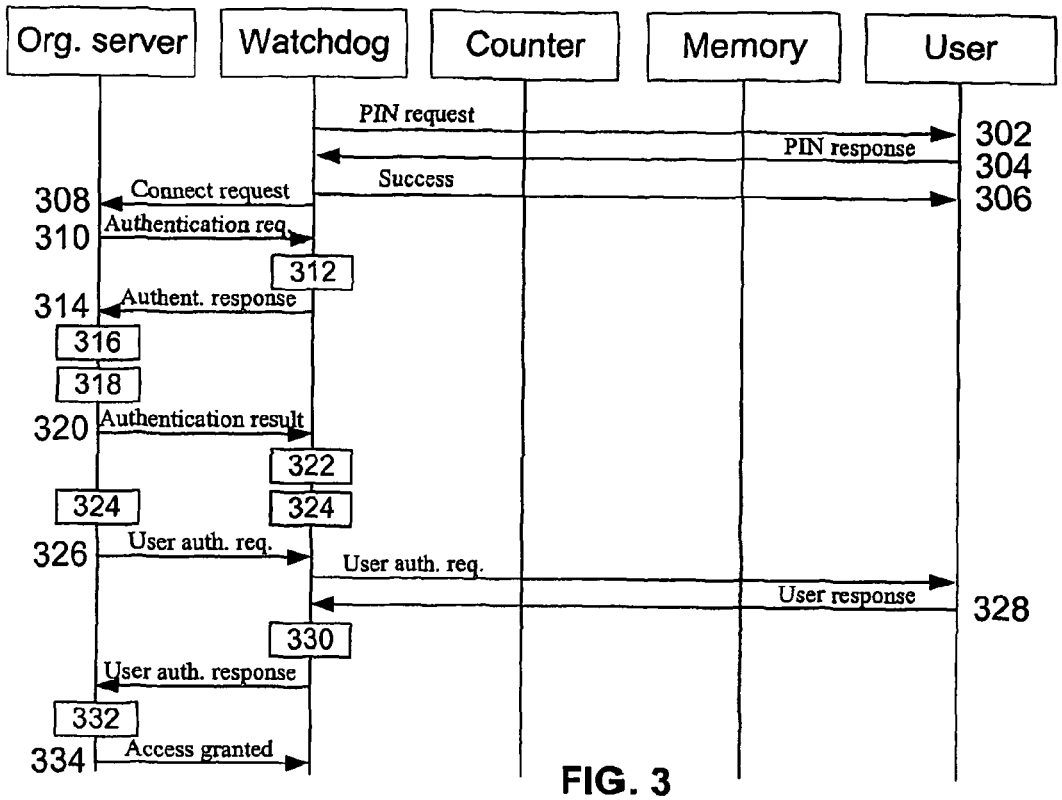
FIG. 3 illustrates an exemplary authentication process of a terminal according to an advantageous embodiment of the present invention.

FIG. 3 illustrates an exemplary authentication process 300 of a terminal according to an advantageous embodiment of the present invention. At first a watchdog at the player's terminal at step 302 requests player to input PIN number as a response to the watchdog at step 304 to activate the watchdog for authentication and betting process. If PIN was valid (PIN input by the player is compared to the valid PIN stored advantageously in the memory means of the terminal) the watchdog informs the player about the success response at step 306, and at step 308 sends a connect request comprising at least terminal identification data to the central domain (more specifically to the organiser's server in the central domain) for authentication process. At step 310 the organiser sends an authentication request to the terminal comprising challenge, after which the watchdog at the terminal computes a response to the challenge at step 312 and sends it to the organiser at step 314. The organiser verifies the response at step 316, and if the response is valid, computes a response at step 318 and sends it to the terminal 320, after which the watchdog at the terminal verifies the response at step 322. At step 324 both the watchdog at the terminal and the organiser generate keys, after which the communication is encrypted and MACced (Message Authentication Code computation).

The player authentication request is sent from the central domain to the terminal and again to the player at step 326, to which the player responds at step 328 by a response comprising his/her username and password, for example. The watchdog at the terminal computes a final response to the request and sends it to the organiser at step 330, which verifies the response at step 332 and grants access at step 334, if the response is valid.

This is an exemplary process of the authentication of the terminal, organiser and player, but it can be implemented also using other authentication process known by a person skilled in the art. However, it is essential feature of the invention that the player and/or the terminal are authenticated somehow.

Figure 4:
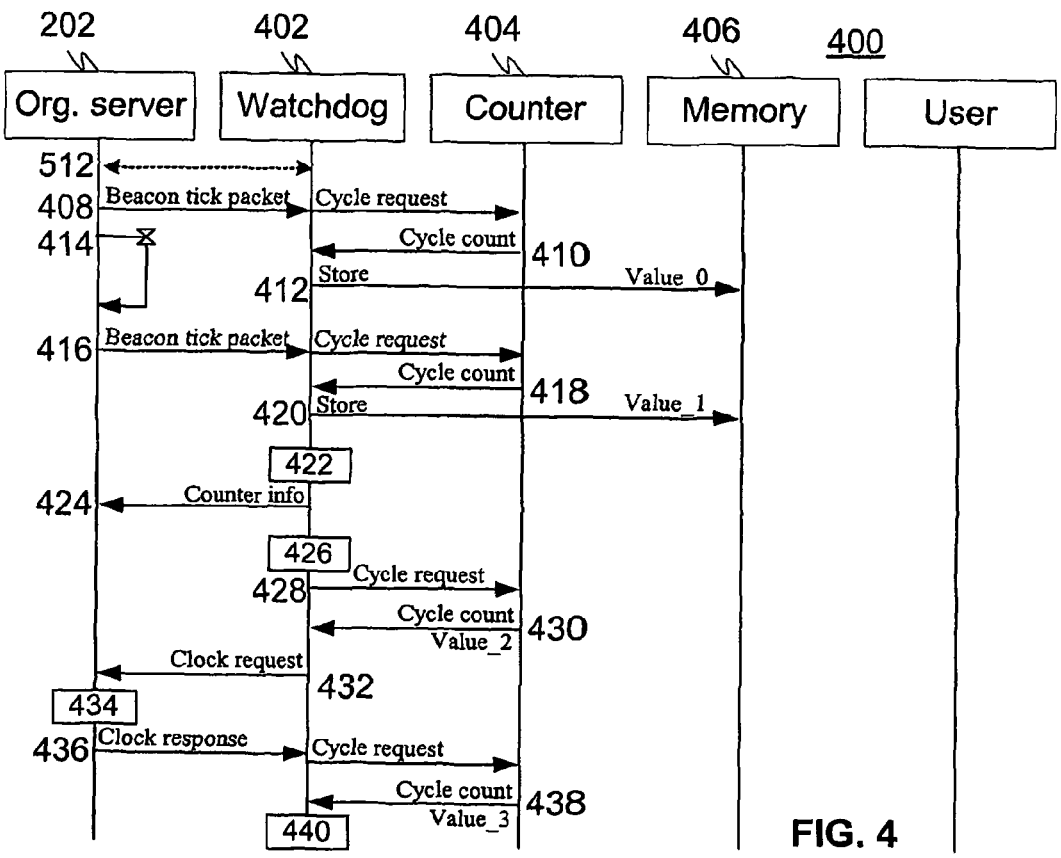
FIG. 4 illustrates an exemplary synchronisation process of a terminal time according to an advantageous embodiment of the present invention.

FIG. 4 illustrates an exemplary synchronisation process 400 of the terminal time according to an advantageous embodiment of the present invention, where the terminal comprises a watchdog 402, free running counter 404 and memory means 406. At first in the synchronisation process 400 the organiser at the central domain 202 may send a broadcast setup information packet to the watchdog 402 at step 512, but this is, however, optional step in the synchronisation process and may be transacted also after the synchronisation process, which is discussed in more detail in connection with FIG. 5.

The organiser at the central domain 202 (or alternatively the broadcaster) starts to send beacon tick packets comprising timing information, security parameters and message authentication code at step 408 to the terminal(s), where the watchdog at the moment of receiving the beacon tick packet sends cycle request to the counter 404 to ask value of the counter at the moment, and reads time information, for example, of the next coming beacon tick packet (tick_interval, in millisecond, for example). Beacon tick packet comprises typically also time information of the central domain's local time, preferably at the moment when the beacon tick packet was sent. At step 410 the counter responds by sending counter value (value_0) at the moment, whereupon at next the watchdog 402 stores identification data of the received beacon tick packet with counter value to the memory means 406 at step 412.

At the same time at step 414 the organiser at the central domain 202 (or alternatively the broadcaster) waits a predetermined time interval (announced within the previous beacon tick packet) and after the time interval sends a second beacon tick packet at step 416 to the terminal, whereupon the watchdog 402 at the moment of receiving the second beacon tick packet sends cycle request to the counter 404 to ask value of the counter at the moment, and reads timing information, for example, of the next coming beacon tick packet (tick_interval). At step 418 the counter responds by sending counter value (value_1) at the moment, whereupon at next the watchdog 402 stores identification data of the received beacon tick packet with counter value to the memory means 406 at step 420.

Next at step 422 the watchdog computes a conversion (mapping) factor by dividing tick interval (time interval between the first and second received beacon tick packets in milliseconds, for example) by the difference of counter values at the moments of receiving the first and second beacon tick packets (value_1–value_0), which is illustrated in a formula (1). The organiser at the central domain is also informed of counter values by sending counter values to it (value_0 and value_1) at step 424. Further the watchdog initialises the local clock of the terminal at step 426 (value of the local clock right after initialisation is denoted by $t_0$ from now on). The value ($t_0$) of local clock after initialisation may be arbitrary. Now it should be noticed that the counter is independent free running counter and it's values changes all the time depending on the rate of the counter (for example hundreds or thousands times in second). In addition local time of the terminal is updated with help of counter values, received beacon tick packets and mapping factor only when necessary.

$$\text{map} := \frac{\text{tic\_interval}}{\text{value\_1} - \text{value\_0}}. \qquad (1)$$

Right after initialisation the watchdog requests new counter value from the counter at step 428, and the counter responds at step 430 by sending counter value (value_2), whereupon the watchdog sends to the organiser's server a request at step 432 to ask central domain's local time at the moment when the organiser gets the request and at the moment when the organiser sends a response to the request. When the organiser receives the request it denotes time at the moment of receiving by $t_1$ (receiving time of the request) and when transmitting the response denotes time at the moment of transmitting by $t_2$ at step 434. The organiser sends $t_1$ and $t_2$ in the response to the terminal at step 436, where the watchdog immediately requests counter value of the counter at the moment of receiving the response. The counter replies by sending a value of the counter at the moment (value_3) at step 438 and the watchdog denotes the moment of receiving the response (value_3) by $t_3$ being terminal's local time according to the terminal's clock.

Now at step 440 the watchdog can synchronise the terminal's local time by the following exemplary steps (illustrated by a formula (2)): at first by adding to its local time a value, which is achieved by multiplying the difference of counter value_3 and value_2 by the mapping factor illustrated in formula (1), and denoting this new local time by $t_4$ (a nature of $t_4$ is only an ancillary value). Secondly an average clock-offset is determined by computing an average value of time intervals between the $t_1$ and $t_0$, and $t_2$ and $t_3$. Last the watchdog updates the local time of the terminal by adding the clock-offset value to the $t_4$, whereupon the local time of the terminal corresponds local time of the central domain.

$$t_4 := \text{local\_clock} + \text{map} \cdot (\text{value\_3} - \text{value\_2}); \qquad (2)$$

$$\text{clock\_offset} := \frac{(t_1 - t_0) + (t_3 - t_2)}{2};$$

$$\text{local\_clock} := t_4 + \text{clock\_offset}.$$

It should be noted that the synchronising process of local time of the terminal is typically continuous process in the background being invisible to the player, whereupon the beacon tick packets are broadcasted and received continuously. Also it should be noted that the method illustrated above is only exemplary and other more progressive method may also be used, such as method, which would notice previous values, such as values of clock offset and local clock.

Figure 5:
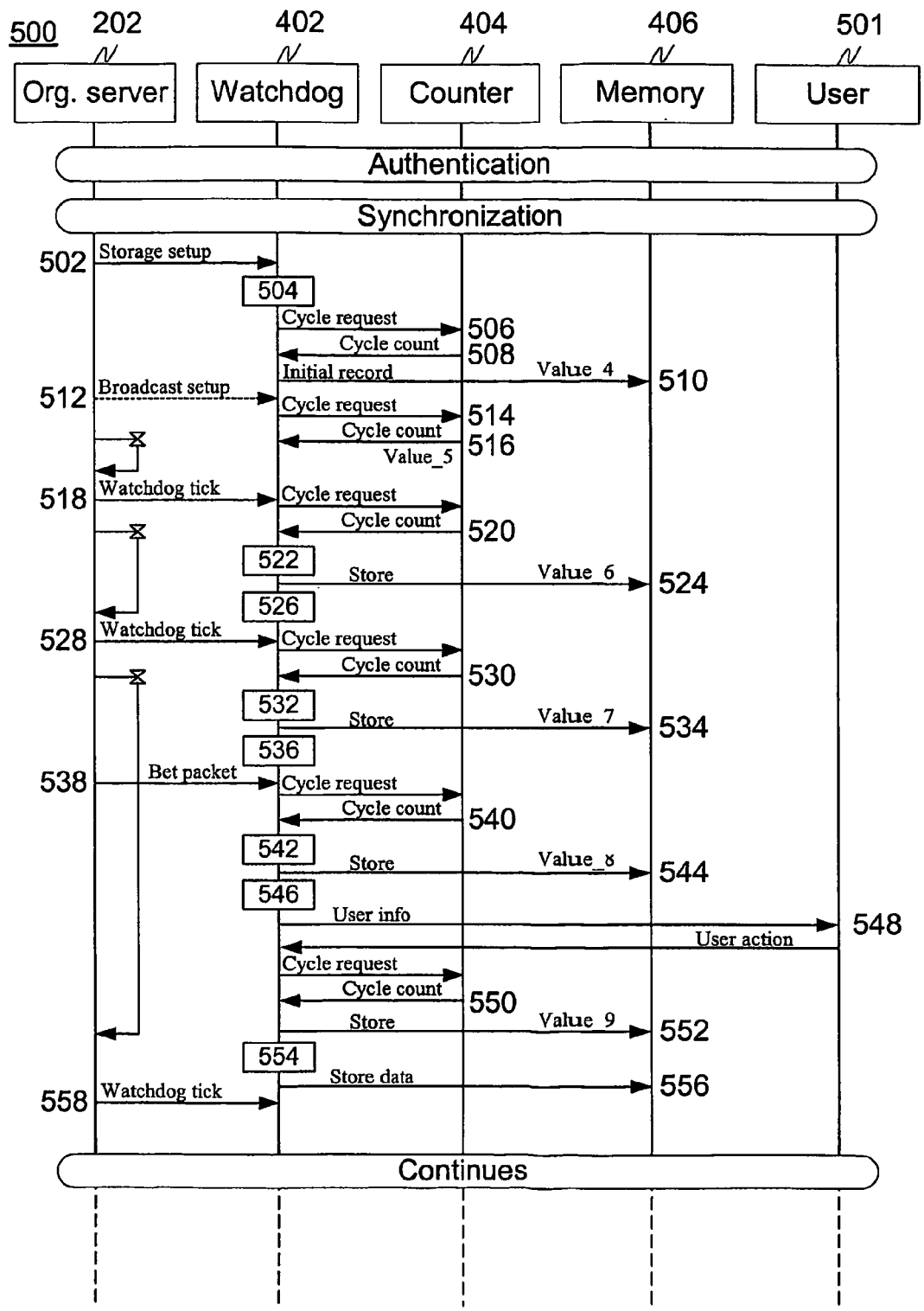
FIG. 5 illustrates an exemplary real-time betting process with a terminal according to an advantageous embodiment of the present invention.

FIG. 5 illustrates an exemplary real-time betting process 500 after authentication and synchronisation process with a terminal according to an advantageous embodiment of the present invention, where at first at step 502 an organiser 202 sends initial key material comprising a seed for keys to the terminal to initialise a bet record storage. At step 504 the watchdog at the terminal creates a storage encryption key by computing for example two encryption keys from initial key material a seed for keys received from the organiser at step 502. The first key may be derived from the seed for example by adding a first random number to the seed and computing a hash value, and the second key by adding a second random number to the seed and computing a hash value. Further the watchdog may also create a storage chain key from chained time information of local time of the terminal and initial key material received from the organiser at step 502, for example. From now on each stored record can be encrypted and chained with current keys and time information of local time of the terminal (or alternatively with value of the counter on behalf of time information). In addition at step 506 the watchdog requests value of the counter and the counter responses at step 508 by counter value (value_4) at the moment, after which the watchdog initialises bet record storage locating in the memory means 406 by an initial record comprising at least counter value (value_4) and initial (seed) data at step 510.

At step 512 the organiser sends broadcast setup information packet comprising a broadcast encryption key and signature key. The step 512 is, however optional step, and may be transacted also at least partly at earlier step in connection with the synchronisation process, for example (see FIG. 4). Further the organiser informs the watchdog by delay information (in milliseconds, for example) to a first watchdog tick packet to be broadcasted to the terminal (watchdog_tick_start_delay), and step 514 the watchdog at the terminal requests value of the counter at the moment of receiving broadcast setup information packet sent by the organiser at step 512. The counter responses by counter value (value_5) at step 516. At the same time the organiser at the central domain 202 waits the predetermined time interval (announced within the broadcast setup information packet) and after the time interval sends the first watchdog tick packet at step 518 to the terminal, whereupon the watchdog at the moment of receiving the first watchdog tick packet sends a request to the counter 404 to ask a value of the counter at the moment. The watchdog tick packet comprises information of organiser's server local time (central domain time, server_time_0), key update and signature, and optionally delay to the next coming watchdog tick packet (next_wd_tick_delay_0), especially if the delay is not constant. At step 520 the counter responds by sending counter value (value_6) at the moment.

The watchdog verifies the organiser's signature received by the watchdog tick packet and if the signature is valid decrypts the watchdog tick packet at step 522. Further the watchdog creates a new storage encryption key by computing hash value of storage encryption key and key update received by the watchdog tick packet from the organiser at step 518 [storage_enc_key:=hash(storage_enc_key, key_update)], and in addition a new storage chain key from storage chain key, time information of local time of the terminal and key update stored into the memory means earlier [storage_chain_key:=hash(storage_chain_key, key_update)], where the key_update advantageously comprises also time information. The hash value is exemplary and may be replaced by computing MAC value, for example. At step 524 the watchdog stores counter's value (value_6) with packet identification information (packet_id) to the memory means 406.

The watchdog also updates the local time of the terminal (if needed) after receiving watchdog tick packet, but only if the watchdog tick packet was received at right time, so before updating the watchdog computes at step 526 the time interval between the broadcast setup information packet received at step 512 and the first watchdog tick packet received at step 518 by multiplying the difference of the counter values at the moments of receiving broadcast setup information packet and the first watchdog tick packet by the mapping factor [delay:=map·(value_6−value_5)], where the mapping factor is determined by the formula (1). The watchdog also updates the local time of the terminal at step 526 by adding the delay computed above to the earlier local clock [local_clock:=local_clock+delay].

Further at step 526 the watchdog verifies that the delay it computed is equal (or essentially equal within predetermined limit or tolerance) to the delay announced in the broadcast setup information packet at step 512 [delay=watchdog_tick_start_delay], and that local time of the terminal after synchronising is equal (or essentially equal) to the organiser's server local time (central domain time) [local_clock:=server_time_0]. If result of delay and local time verification is acceptable, the watchdog allows the betting process 500 to going on, and if not alerts the player (and alternatively also the organiser) and freezes the betting process. However a predetermined tolerance in verification may be allowed, whereupon the watchdog may furthermore updates the local time of the terminal at step 526 corresponding to central domain's local time announced in the watchdog tick packet received at step 518. It should be noticed that the watchdog updates only the local time of the terminal, and does not change or affect value or rate of the counter(s).

At the same time when the watchdog performs the verification and updating process at step 526, the organiser at the central domain 202 waits the predetermined time interval (next_wd_tick_delay_0, announced within the previous (first) watchdog tick packet) and after the time interval sends the second watchdog tick packet at step 528 to the terminal, whereupon the watchdog at the moment of receiving the second watchdog tick packet again sends a request to the counter 404 to ask a value of the counter at the moment. The watchdog tick packet comprises information of organiser's server local time at the time of sending the packet (central domain time, server_time_1), key update, signature and optionally also delay to the next coming watchdog tick packet (next_wd_tick_delay_1). At step 530 the counter responds by sending counter value (value_7) at the moment.

The watchdog verifies the organiser's signature received by the watchdog tick packet and if the signature is valid decrypts the watchdog tick packet at step 532. Further the watchdog creates a new storage encryption key by computing hash value of storage encryption key and key update received by the watchdog tick packet from the organiser at step 528 [storage_enc_key:=hash(storage_enc_key, key_update)], and in addition a new storage chain key from storage chain key, time information of local clock of the terminal and key update stored into the memory means earlier [storage_chain_key:=hash(storage_chain_key, key_update)], where the key_update advantageously comprises also time information. At step 534 the watchdog stores counter's value (value_7) with packet identification information (packet_id) to the memory means 406.

The watchdog also updates the local time of the terminal (if needed) after receiving watchdog tick packet, but only if the watchdog tick packet was received at right time, so before updating the watchdog computes at step 536 the time interval between the first watchdog tick packet received at step 518 and the second watchdog tick packet received at step 528 by multiplying the difference of the counter values at the moments of receiving the first watchdog tick packet and the second watchdog tick packet by the mapping factor [delay:= map·(value_7−value_6)], where the mapping factor is determined by the formula (1). The watchdog also updates the local clock of the terminal at step 536 by adding the delay computed above to the earlier local clock [local_clock:= local_clock+delay].

Further at step 536 the watchdog verifies that the delay it computed is equal to the delay announced in the first watchdog tick packet at step 518 [delay=next_wd_tick_delay_0], and that local time of the terminal after synchronising is equal to the organiser server time (central domain time) [local_clock:=server_time_1]. If result of delay and local time verification is acceptable, the watchdog allows the betting process 500 to going on, and if not alerts the player (and alternatively also the organiser) and freezes the betting process. However a predetermined tolerance in verification may again be allowed, whereupon the watchdog may furthermore updates the local time of the terminal at step 536 corresponding to central domain's local time announced in the watchdog tick packet received at step 528. It should be noticed that the watchdog updates only the local time of the terminal, and does not change or affect value or rate of the counter(s).

As an example the organiser sends at step 538 a bet packet to the terminal, where the bet packet comprises betting data, such as targets, rates and options, and organiser's server local time (central domain time, server_time_2), key update, and signature, whereupon the watchdog at the moment of receiving the bet packet sends a request to the counter 404 to ask a value of the counter at the moment. At step 540 the counter responds by sending counter value (value_8) at the moment.

The watchdog verifies the organiser's signature received by the bet packet and if the signature is valid decrypts the bet packet at step 542. Further the watchdog creates a new storage encryption key by computing hash value of storage encryption key and key update received by the bet packet from the organiser at step 538 [storage_enc_key:=hash(storage_enc_key, key_update)], and in addition a new storage chain key from storage chain key, time information of local clock of the terminal and key update stored into the memory means earlier [storage_chain_key:=hash(storage_chain_key, key_update, time)]. At step 544 the watchdog stores counter's value (value_8) with bet packet identification information (packet_id) to the memory means 406.

The watchdog also updates the local time of the terminal at step 546 by computing the time interval between the last action (the second watchdog tick packet received at step 528) and the bet packet received at step 538 by multiplying the difference of the counter values at the moments of receiving the second watchdog tick packet and the bet packet by the mapping factor and adding the result to the local clock updated earlier at step 536 [local_clock:=local_clock+map·(value_8−value_7)], where the mapping factor is determined by the formula (1). The watchdog also verifies at step 546 that the updated local time is (essentially) equal to the central domain's local time (server-time_2, received by the bet packet at step 538), and if result of verification is acceptable, the watchdog allows the betting process 500 to going on, and if not alerts the player (and alternatively also the organiser) and freezes the betting process.

If the result of verification was acceptable the watchdog informs the player 501 by the content of the received bet packet at step 548, whereupon the player 501 may response for example by placing his/her bet. When receiving the player's response the watchdog sends a request to the counter 404 to ask a value of the counter at the moment. At step 550 the counter responds by sending counter value (value_9) at the moment, after which the watchdog stores counter's value (value_9) with layer's response identification information (user_input_id) to the memory means 406 at step 552. Further the watchdog also updates the local time of the terminal at step 554 by computing the time interval between the last action (receiving the bet packet at step 538) and the player response at step 548 by multiplying the difference of the counter values at the moments of receiving the bet and the player's response by the mapping factor and adding the result to the local clock updated earlier at step 546 [local_clock:= local_clock+map·(value_9−value_8)], where the mapping factor is determined by the formula (1). Moreover the watchdog stores local time information, data of the received bet packet and the player's response to the bet record storage of the memory means 406 at step 556.

Again at the same time the organiser has waited the predetermined time interval (announced within the second watchdog tick packet) and after the time interval sends the third watchdog tick packet at step 558 to the terminal, comprising information of organiser server time at the time of sending the third watchdog tick packet (central domain time, server_time_3), key update, signature, and optionally also delay to the next coming watchdog tick packet (next_wd_tick_delay_1). The betting process 500 may continue onwards essentially by same way than described herein, until the organiser sends the bet end and/or session end packet and collects the stored data, such as placed bet with time information (bet records), from the memory means 406 of the terminal.

Figure 6:
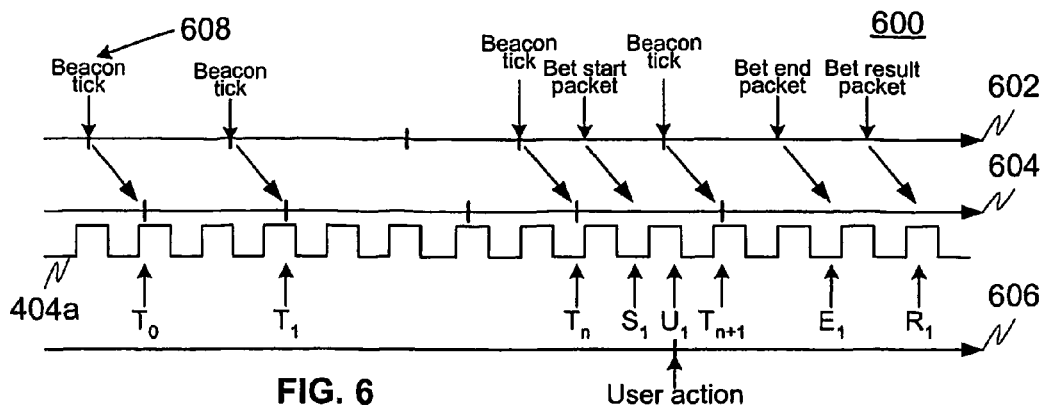
FIG. 6 illustrates an exemplary diagram of use of a free running counter of a terminal according to an advantageous embodiment of the present invention.

FIG. 6 illustrates an exemplary diagram 600 of use of a free running counter 404a of a terminal according to an advantageous embodiment of the present invention, where the rate of the counter 404a is constant. The uppermost line illustrates local time of the organiser's server time (central domain) 602, the line 604 illustrates time line of network input of the terminal and the lowermost line 606 is player input action line.

When the beacon tick packet 608 is sent from the organiser's server, time information relating to the local time of the organiser's server (central domain) is stored into the beacon tick packet. The sloping arrow from the uppermost line 602 to the line 604 illustrates time delay when the beacon tick packet is broadcasted from the organiser's server (or alternatively from the broadcaster) to the terminal. Time delay from the organiser's server (or alternatively from the broadcaster) to the terminal is essentially constant and depends internal delays of the broadcasting elements and delays of transmission paths between the organiser's server (or alternatively the broadcaster) and the terminal. When the beacon tick is received on the terminal a value of the free running counter 404a is read ($T_0$). The beacon tick packet may also comprise information of delay to the next coming beacon tick packet ($t_0$).

Every time when some information packet is received at the terminal, or player is made some action, such as placed his/her bet, a value of the free running counter 404 is read and advantageously stored in a memory means of the terminal for later user or verification. Information packet received by the terminal may be, for example, beacon tick packets ($T_0, T_1, T_n, T_{n+1}$), bet start packets ($S_1$), bet end packets ($E_1$) and bet result packets ($R_1$), and player actions may be, for example, bet place (U1). The free running counter 404 of the terminal is used for example to measure adjacent received beacon tick packet intervals in terms of local clock cycles, and to measure the interval from a player input to the (two) surrounding beacon tick packets.

Figure 10:
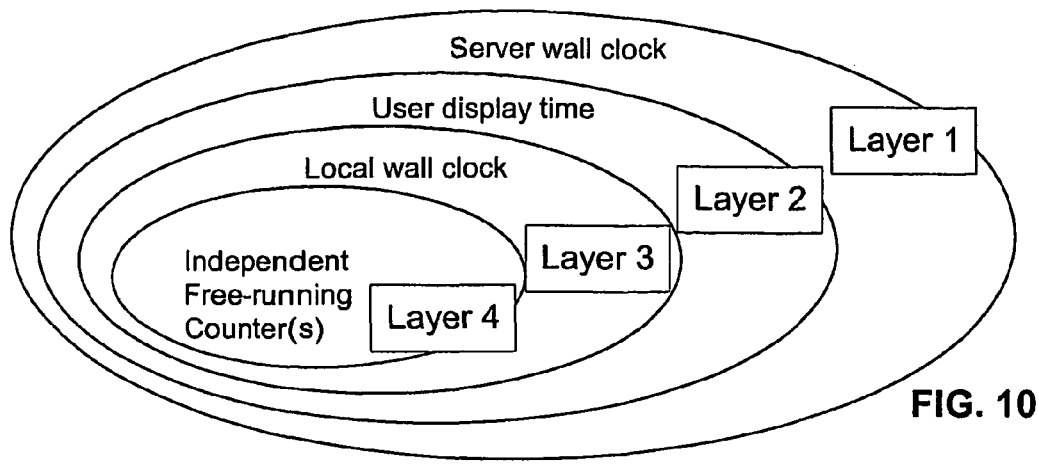
FIG. 10 illustrates an exemplary description of a layer nature of a betting environment according to an advantageous embodiment of the present invention.

It should be noticed that the procedure and use of the free running counter illustrated in FIG. 6 is advantageously related to a layer 4 events, and that there can be more than one free running counter dedicated to the layer 4, such as first counter for internal log of events and second counter for layer 3 time service, for example (the layer nature of the invention is illustrated in FIG. 10).

Figure 7:
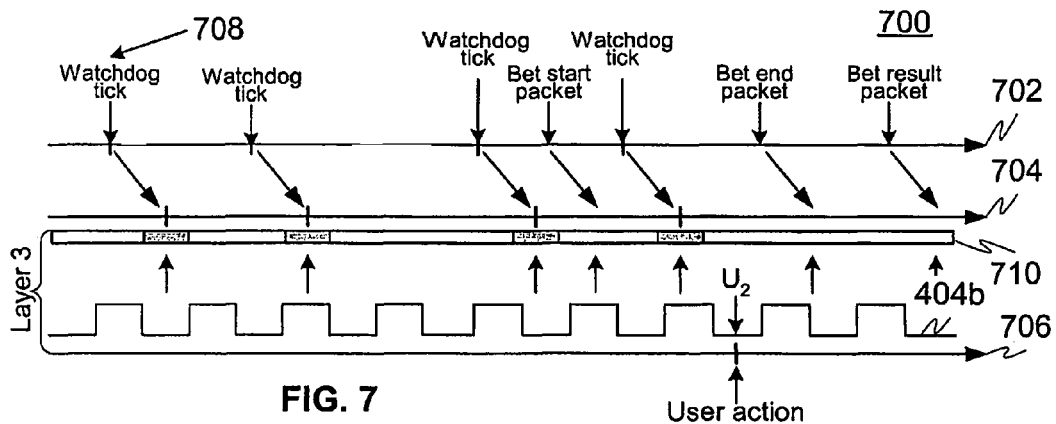
FIG. 7 illustrates another exemplary diagram of use of a free running counter of a terminal according to an advantageous embodiment of the present invention.

FIG. 7 illustrates another exemplary diagram 700 of use of free running counter of the terminal according to an advantageous embodiment of the present invention, where the rate of the counter is essentially constant. The line 404b illustrates values of mapped free running counter and the local time of the terminal is illustrated by line 710. Local time of the terminal is managed advantageously by a layer 3 described more details in connection with FIG. 10. The uppermost line 702 illustrates time of the organiser's server local time (central domain), the line 704 illustrates time line of network input of the terminal and the lowermost line 706 is player input action line. In this example the cycle of the free running counter is mapped (by the mapping factor, provided by the layer 3) so that one cycle of line 404b corresponds with a certain time, such as one cycle corresponds with one millisecond, for example.

When the watchdog tick packet 708 is sent from the organiser's server, time information relating to local time of the organiser's server (central domain) is stored in the watchdog tick packet. The sloping arrow from the uppermost line 702 to the line 704 illustrates time delay when the watchdog tick packet is broadcasted from the organiser's server (or alternatively from the broadcaster) to the terminal. Time delay from the organiser's server (or alternatively from the broadcaster) to the terminal is essentially constant and depends internal delays of the broadcasting elements and delays of transmission paths between the organiser's server (or alternatively the broadcaster) and the terminal.

When the watchdog tick packet is received on the terminal a mapped value of the free running counter 404b is read ($T_0$), or local time of the terminal by help of the counter 404b, actually, and time of the central domain announced by the watchdog tick packet is compared to the local time of the terminal (line 710). The watchdog tick packet is accepted only, if local time of the terminal is essentially same than time information relating to the central domain's local time announced by the received watchdog tick packet (terminal clock≈server clock). The shaded area in the line 710 of the local time of the terminal illustrates allowed tolerance between the clocks of the terminal and central domain. The terminal clock here relates to the layer 3 clock, discussed more detail in connection with FIG. 10, for example. If the watchdog tick packet is accepted (local time of the terminal is essentially same than local time of the central domain announced by the received watchdog tick packet) local time of the terminal is updated to the same time with central domain's local time announced by the received watchdog tick packet. Further the clock offset can also be updated.

The watchdog tick packet may comprise information of delay to the next coming watchdog tick packet, whereupon the delay is verified when the next watchdog tick packet is received at the terminal. Alternatively the delay may be essentially constant and predetermined, whereupon the delay when the next watchdog tick packet must come can be calculated beforehand, for example. Furthermore, when receiving a bet start packet, time information relating to the organiser's server (central domain) local time stored in the bet start packet is compared to local time of the terminal, and if local time of the terminal is essentially same than time information relating to the central domain announced by the received bet start packet, the bet start packet is accepted. Otherwise the player is alerted (and alternatively also the organiser) and the betting process is frozen. Also when the player places his/her bet ($U_2$) local time of the terminal is read and stored with the player's bet into the bet record storage, for example. The recorded local time information is verified when the bet end packet is received, and if the recorded local time is less than bet end time announced in the received bet end packet, the bet can be allowed, but if the recorded local time is more than bet end time announced in the received bet end packet, the bet can be rejected.

It should be noticed that the procedure and use of the free running counter illustrated in FIG. 7 is advantageously related to a layer 3 events, and that there can be more than one free running counter dedicated to the layer 3 (the layer nature of the invention is illustrated in FIG. 10). The counter 404b is advantageously used for staying in sync between the watchdog tick packets.

Figure 8:
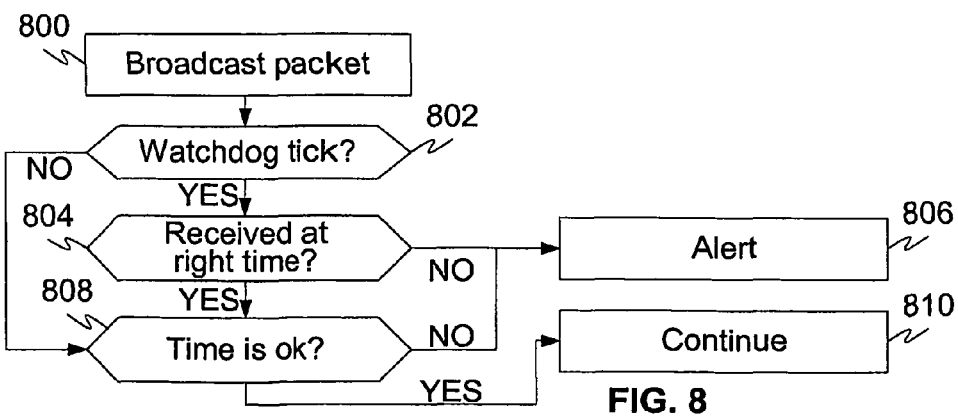
FIG. 8 illustrates an exemplary timing process when receiving data packets within a terminal according to an advantageous embodiment of the present invention.

FIG. 8 illustrates an exemplary timing process 800 when receiving data packets, and especially watchdog tick packets, within the terminal according to an advantageous embodiment of the present invention, where at step 802 it is checked whether the received data packet is watchdog tick packet. If the received data packet is not watchdog tick packet, but is a beacon tick or bet start/end, or result packet comprising local time of the central domain, for example, the time information of the packet is checked and compared to local time of the terminal at step 808. If local time of the central domain announced in the received data packet is essentially same than local time of the terminal, the packet is allowed and a betting process is continued at step 810. Otherwise the player is alerted (and alternatively also the organiser) and the betting process is frozen at step 806.

If the data packet received at step 802 is a watchdog tick packet, the receiving time is verified at step 804, because every watchdog tick packet comprises information of delay to the next coming watchdog tick packet, or alternatively the delay is constant and the right receiving time is calculated beforehand, whereupon the valid receiving time of the received watchdog tick packet can be verified based on the information of the previous watchdog tick packet (or broadcast setup information packet, if the received watchdog tick packet is the first received watchdog tick packet), or alternatively based on the calculation in a case of constant delay. In the case of constant delay it is not required for watchdog tic packets to comprise delay information. If the watchdog tick packet is received at the right time, time information relating to the central domain's local time announced in the received watchdog tick packet is compared to local time of the terminal at step 808. If the watchdog tick packet is not received at the right time, the player may be alerted (and alternatively also the organiser) and the betting process frozen at step 806.

Figure 9:
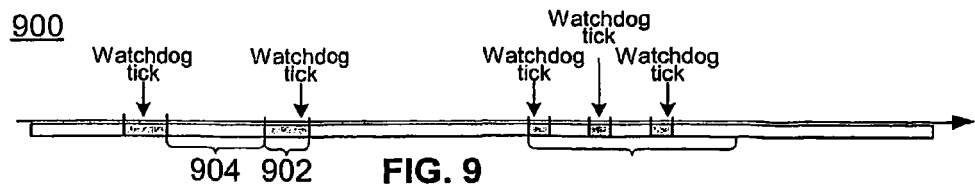
FIG. 9 illustrates an exemplary chart of timing process when receiving data packets within a terminal according to an advantageous embodiment of the present invention.

FIG. 9 illustrates an exemplary chart of timing process 900 when receiving data packets, especially watchdog tick packets or other data packets, which may comprise information of delay of next coming data packet or where delay is otherwise known, within the terminal according to an advantageous embodiment of the present invention. The delay of next coming data packet is verified when the next data packet is received at the terminal. Also local time of the central domain announced by the received data packet is compared to the local time of the terminal, and the data packet is accepted only, if local time of the terminal is essentially same than local time of the central domain announced by the received data packet, and the received data packet is received at the moment announced by the delay information of the previous data packet or delay which is otherwise calculated. The shaded area 902 in the line 710 illustrates allowed tolerance between the clocks of the terminal and central domain, and the area 904 between the shaded are in the line 710 illustrates delay of next coming data packet. It should be noticed that according to an advantageous embodiment of the invention data packets to be broadcasted comprises also information of the allowed tolerance 902, and the tolerance may be changed to longer or shorter, if needed.

FIG. 10 illustrates an exemplary description of the layer nature 1000 of the betting environment according to an advantageous embodiment of the present invention, where the layer 1 relates to events within the organiser's server on the central domain, and being thus out of hacking. The layer 1 offers central domain's local time (the most legal time of the whole betting system) to the distributed domain, for example, by sending time information within data packets broadcasted to the terminals of the distributed domain. Layer 1 may also comprise a broadcaster, but this optional.

The layer 4 is the most protected functionality within the terminal of the distributed domain, to which the independent free running counter (or counters) belongs. One counter of the layer 4 may be dedicated for internal log of event only, being completely protected so that value of the counter is not readable outside, for example. Another counter of the layer 4 may be dedicated for layer's 3 time service so that time of the local of the terminal which is needed for verifying validity of the receiving moments of the received data packets and to time stamping placed bets (which are layer's 3 events), for example, is provided by the counter belonging to the layer 4.

The layer 3 relates mainly to secured local time of the terminal, and secured functions of the terminal, such as watchdog, bet record construction (from received bet packets, player inputs and local of the terminal) and synchronisation of the local time of the terminal by help of received data packets (beacon ticks, watchdog ticks, bet start/end packets, and results) and values of the counter(s) of the layer 4. According to the invention at least one counter of the layer 4 provides layer 3 secured time.

The layer 2 relates to insecure events (insecure for user manipulation) within the terminal, such as offers regularly updated application clock time for player on a display of the terminal. Time displayed may be received/derived for example straight from watchdog tick and bet start/end packets, or alternatively time displayed for the player is derived from the layer's 3 secured local time. However, the purpose of the displayed time is to aid the player by providing a more accurate time, which is essentially same as local time at the organiser's server.

Figure 11:
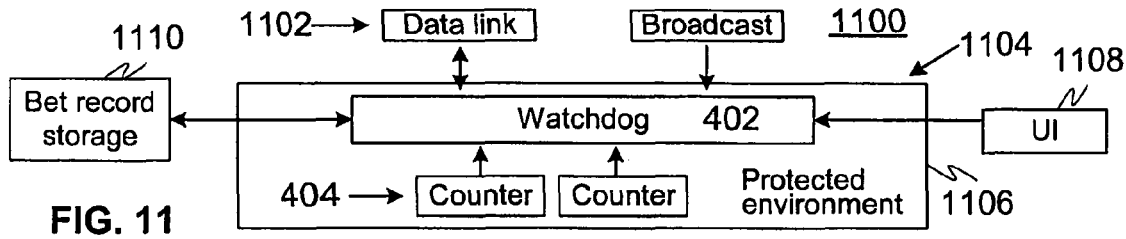
FIG. 11 illustrates exemplary components in a betting environment according to an advantageous embodiment of the present invention.

FIG. 11 illustrates exemplary components in a betting environment 1100 according to an advantageous embodiment of the present invention comprising a central domain 1102 and distributed domain 1104, which is in practice a terminal, comprising a protected environment 1106 to which a watchdog functionality 402 and counter(s) 404 belong, for example. Further the distributed domain or terminal comprises also at least a user interface 1108 and bet record storage 1110. Next the functionality of the betting environment 1100 is discussed more details in a view of place a bet.

The watchdog 402 uses two-way data link for receiving data from the central domain 1102 in order to synchronise offset of local of the terminal, initialise the bet record storage and also for receiving broadcast parameters. The two-way link is also used for collecting bet records from the bet record storage to the organiser's server within the central domain.

The watchdog 402 uses also one-way data link for receiving beacon tick and watchdog tick packets (regular external clock signal), watchdog key update packets, and bet start/end packets and results from central domain to the terminal.

The watchdog 402 locally generates a clock signal by help of received data packets and values of counter(s), as previously described, for the purposes of keeping reliable local clock time at the terminal and also for furnishing each of the placed bets or electronic records with a cryptographically protected proof of a certain moment of distributed domain's local time associated with the generation of the electronic record. Before the bet generation the watchdog 402 receives a bet start packet from the central domain through one-way link, authenticates the sender of the bet start packet, decrypts the packet and displays the content of the bet start packet to the player. The player may then place his/her bet(s) using user interface means 1108, whereupon the watchdog means may generate a (multitude) of electronic record(s) containing prediction(s) of the outcome of the incident (bet(s) placed by the player).

The watchdog may use advantageously an algorithm for generating the electronic records, and then furnishing (time-stamped) them with a cryptographically protected proof of a certain moment of distributed domain's (terminal) local time associated with the generation of the electronic record. The watchdog may furnish (time-stamp) the electronic records either with local time of the terminal or alternatively with value(s) of the counter(s), which is/are unambiguously associable to local time of the terminal and/or moment of generation of the electronic record.

The watchdog functionality is advantageously performed within a protected integrated circuit in order to secure generation of electronic record and time-stamping process against unauthorised access. An advantageous way of performing the time-stamping for example in the environment of FIG. 11 is such that both the generation of the local clock signal and the actual time-stamping take place within a single protected integrated circuit belonging to the protected terminal, namely watchdog 402, for example. The time-stamping means then that a bet record is input into the protected integrated circuit, and time information of the local located within the circuit is combined to the bet record with a cryptographic algorithm, which itself is also permanently stored in a memory means within the protected integrated circuit. An unauthorised party does not know the key and can not deduce it by analysing performed time-stampings due to its pseudo-random, cryptographic nature. According to an exemplary embodiment of the invention the watchdog comprises such a protected integrated circuit (watchdog hardware).

Next couple of example to generate electronic records from placed bet and furnish them with time information relating to local time of the terminal is described. According to a first embodiment, the watchdog may furnish each of the electronic records with a cryptographically protected proof of a certain moment of local time associated with the generation of the electronic record by generating a time-stamped electronic record through the watchdog algorithm, which uses the plaintext contents of the electronic record and a clock signal relating to local time as input information.

According to a second embodiment, the watchdog may generate an authenticated and encrypted electronic record through the watchdog algorithm which uses the plaintext contents of the electronic record, but also a private key of the party generating the electronic record (terminal's or watchdog's private key) and a public key of an intended recipient of the time-stamped, authenticated, encrypted electronic record (organiser's public key) as input information to the algorithm.

Further the watchdog may encrypt the generated electronic record using a clock signal and it's private key as input information. The generated and time-stamped electronic record is then stored into the bet record storage for later bet record collection to the organiser's server (central domain).

Within the organiser's server (central domain) the generated and time-stamped electronic record is accepted as valid on the condition if the cryptographically protected proof of a certain moment of local time of the distributed domain shows that said certain moment of tine was not later in time than a certain time limit, when the betting was ended. Further within the central domain, after the outcome of the incident is known, and if the generated and time-stamped electronic record was accepted as valid, it is found out whether the generated and time-stamped electronic record contains a correct prediction of the outcome of the incident.

Figure 12:
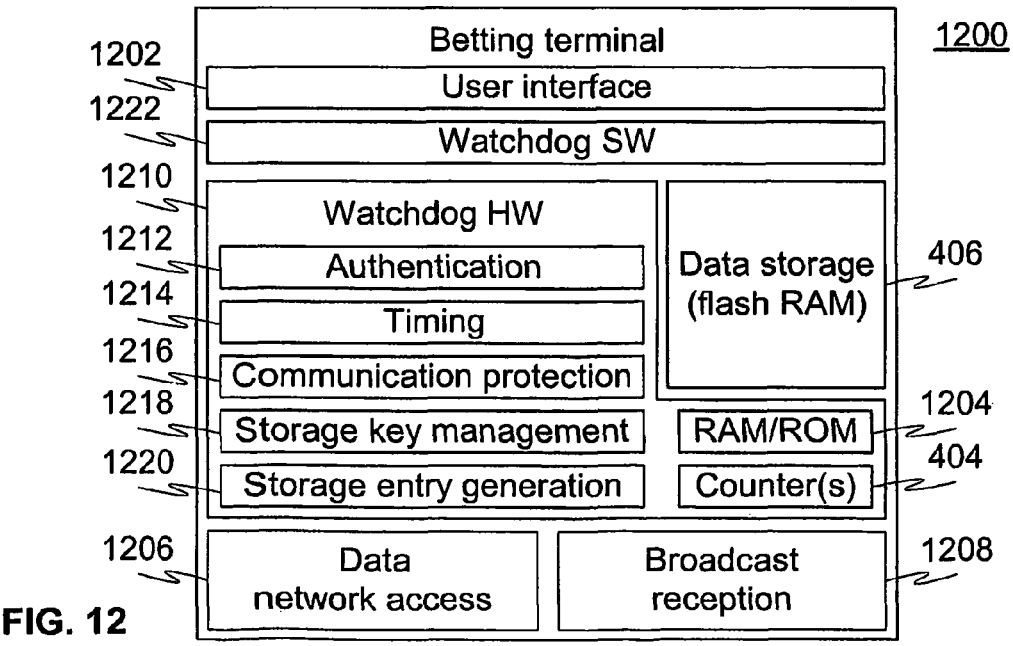
FIG. 12 illustrates an exemplary architecture of a terminal according to an advantageous embodiment of the present invention.

FIG. 12 illustrates an exemplary architecture of the (betting) terminal 1200 belonging to the distributed. domain according to an advantageous embodiment of the present invention. The terminal 1200 advantageously comprises user interface 1202, such as keyboard and display, memory means 406 for bet record storage implemented by flash RAM, for example, and memory means 1204 implemented by RAM/ROM for other purposes. Further the terminal 1200 comprises data network access means 1206 for establishing two-way data link between the terminal and organiser within the central domain, for example. Two-way data link is needed for local clock offset synchronisation of the terminal, bet record storage initialisation and transferring of broadcast parameters. Furthermore the terminal 1200 comprises broadcast reception means 1208 for establishing one-way data link between the terminal and organiser within the central domain (more precisely: from central domain to the terminal), for example. One-way data link is needed for transferring beacon tick and watchdog tick packets (regular external clock signal), watchdog key update packets, and bet packets from central domain to the terminal 1200.

The terminal 1200 comprises also a protected environment for most secured functionalities, and it is advantageously implemented by watchdog hardware means 1210 comprising authentication means 1212 for implementing authentication procedure illustrated in FIG. 3, such as authentication of watchdog data, and identity of the terminal and organiser's server (central domain). The watchdog hardware means 1210 comprises also timing means 1214, which is responsible for assigning counter 404 values with terminal events (packet received, player input), controlling that watchdog tick packets are received and that they are received at right time, and adjusting local time of the terminal according to received data packets.

In addition the watchdog hardware means 1210 comprises communication protection means 1216 for encrypting and decrypting communication and checking signatures, storage key management means 1218 for creating and updating keys for storing data, such as placed bets, and storage entry generation means 1220 for encrypting and chaining entries, and adding time-stamps and/or counter values to data, such as placed bets. The watchdog hardware means 1212 comprises also at least one counter 404. Moreover the terminal 1200 comprises watchdog software means 1222, which is responsible for authentication of a player, and processing of application data, for example.

According to an essential feature of the invention the terminal is arranged to handle electronic records that contain predictions of the outcome of a certain incident, by generating a multitude of electronic records that contain predictions of the outcome of the incident, and by furnishing each of the electronic records with a cryptographically protected proof of a certain moment of distributed domain's local time associated with the generation of the electronic record. Further the terminal is arranged to receive beacon tick and watchdog tick packets, comprising time information of the central domain's local time, and broadcasted from the central domain by a predetermined time interval. The terminal is arranged also to synchronise its local time with the central domain's local time by help of values of the free running counter and time information in received beacon tick packets broadcasted from the central domain by a predetermined time interval. Furthermore the terminal is arranged to verify a validity of local time of the terminal regarding to the central domain's local time by comparing local time of the terminal to the time information in received watchdog tick packets, beacon tick packets, bet start/end packets and any other information packets containing time-stamp or other time information of the central domain's (organiser's server) local time and received from the central domain (organiser's server).

Moreover the invention relates to a computer program product directly loadable into the internal memory of a digital computer. The product advantageously comprises software code portions for performing the steps illustrated in FIGS. 2-9, and in particularly the steps of claim 1, relating to methods for real-time betting, authentication and synchronisation of local time of the distributed domain, when said product is run on a computer. In addition the invention relates to a computer program product stored on a computer usable medium. The product advantageously comprises computer readable program means for causing a computer to perform the steps illustrated in FIGS. 2-9, and in particularly the steps of claim 1, relating to methods for real-time betting, authentication and synchronisation of local time of the distributed domain, when said product is run on a computer.

Figure 13:
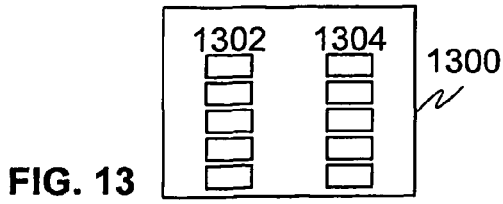
FIG. 13 illustrates an exemplary architecture of a circuit means according to an advantageous embodiment of the present invention.

Furthermore FIG. 13 illustrates an exemplary architecture of a circuit means 1300, such as protected integrated circuit means, for real-time betting, within a communications system comprising a distributed domain and a central domain, where the circuit means belongs to the distributed domain, by handling electronic records that contain predictions of the outcome of a certain incident, according to an advantageous embodiment of the present invention. The circuit means 1300 comprises typically number of software 1302 and hardware 1034 means, by help of which the circuit means 1300 is arranged to generate, within the distributed domain, an electronic record that contains a prediction of the outcome of the incident, according to a player's input, and furnish, within the distributed domain, the electronic record with a cryptographically protected proof of a certain moment of a distributed domain time associated with the generation of the electronic record. Further the circuit means 1300 is arranged, by help of the software 1302 and hardware 1304 means, to receive, within the distributed domain, repetitive beacon tick packets and watchdog tick packets, comprising time information of local time of the central domain at the moment the packet was sent, synchronise local time of the distributed domain, with time equated with the central domain time information received by the beacon tick packets, by help of values of a counter in the terminal and time information in received beacon tick packets, and verify validity of local time of the distributed domain regarding to the central domain's local time by comparing local time of the distributed domain to time information relating to the local time of the central domain received by the watchdog tick packets.

The invention has been explained above with reference to the aforementioned embodiments, and several advantages of the invention have been demonstrated. It is clear that the invention is not only restricted to these embodiments, but comprises all possible embodiments within the spirit and scope of the inventive thought and the following patent claims.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A computer implemented method for real-time betting, within a communications system comprising a distributed domain and central domain, by handling electronic records that contain predictions of the outcome of a certain incident, comprising:
   generating, with a processor and within the distributed domain, a multitude of electronic records that contain predictions of the outcome of the incident, according to players' inputs,
   furnishing, within the distributed domain, each of the electronic records with a cryptographically protected proof of a certain moment of a distributed domain time associated with the generation of the electronic record,
characterized in that the method further comprises:
   receiving, within the distributed domain, repetitive beacon tick packets and watchdog tick packets, comprising time information of local time of the central domain at the moment the packet was sent,
   synchronizing local time of the distributed domain, with time equated with the central domain time information received by the beacon tick packets, by help of values of a counter in the distributed domain and time information in received beacon tick packets, and
   verifying validity of local time of the distributed domain regarding to the central domain's local time by comparing local time of the distributed domain to time information relating to local time of the central domain received by the watchdog tick packets.

2. The method according to claim 1, characterized in that the synchronization of local time of the distributed domain comprises:
   receiving, within the distributed domain, repetitive first and second beacon tick packets broadcasted by a predetermined time interval and reading a value of the counter at the moment of receiving the first and second beacon tick packets, in order to create a conversion factor comparable to the interval of the first and second received beacon tick packets and to the values of the counter at the moments of receiving the first and second beacon tick packets,
   sending a request from the distributed domain to the central domain to send a response to indicate accurate central domain's local time at the moment of receiving the request and at the moment of sending the response,
   initializing a clock indicating local time of the distributed domain, receiving the response from the central domain and reading time information of the central domain's local time and a value of the counter at a moment of receiving the response, in order to construct a clock offset by computing an average delay between $t_1$ and $t_0$, and $t_2$ and $t_3$, and
   updating new local time of the distributed domain essentially equating to the central domain's local time by adding to latest local time ($t_0$) of the distributed domain the clock offset and a value derived by multiplying with the conversion factor the difference of the values of the counter at the moment of receiving the response from the central domain and at the moment of sending the request to the central domain.

3. The method according to claim 1, characterized in that the betting process is an off-line betting process.

4. The method according to claim 1, characterized in that the beacon tick packets and watchdog tick packets are broadcasted by a predetermined time interval.

5. The method according to claim 1, characterized in that the beacon tick packet, being protected information packet broadcasted to a distribution domain regularly, comprises at least one of the following information: time information relating to central domain's local time at a moment the beacon tick packet was sent from the central domain, delay of the next coming beacon tick packet to be broadcasted to the distributed domain, security parameters, and message authentication code.

6. The method according to claim 1, characterized in that the watchdog tick packet comprises at least one of the following information: time information relating to central domain's local time at a moment the watchdog tick packet was sent from the central domain, delay of the next coming watchdog tick packet to be broadcasted to the distributed domain, security parameters, key updates and message authentication code.

7. The method according to claim 1, characterized in that delay of the next coming watchdog and/or beacon tick packet is compared to delay information announced in the previous watchdog and/or beacon tick packet, and the watchdog and/or beacon tick packet is accepted only if the delay of the next coming watchdog and/or beacon tick packet is valid.

8. The method according to claim 1, characterized in that the beacon tick packets and watchdog tick packets are broadcasted from the central domain.

9. The method according to claim 1, characterized in that the beacon tick packets are broadcasted by a Digital Audio Broadcasting transmitter arrangement and/or a Digital Video Broadcasting transmitter arrangement.

10. The method according to claim 1, characterized in that an interval from the players input to latest to next beacon tick packet is measured either in terms of counter values or of distributed domain's local time, and stored in a cryptographically form with the players input to the electronic record.

11. The method according to claim 1, characterized in that a value of the counter and/or an electric clock signal representing the local time of the distributed domain at the said moment is used as an input in generating a cryptographically protected proof of a certain moment of a distributed domain.

12. The method according to claim 1, characterized in that the counter is a free running independent counter, and the distributed domain comprises more than one counter the rate of which are constant and independent of each other, and in that values of the first counter are used for internal log of events and returned to the central domain, and values of the second counter are used for time service of the distributed domain.

13. The method according to claim 1, characterized in that stored data, a value of the counter and/or an electric clock signal representing the local time of the distributed domain are chained by help of a key.

14. The computer program product directly loadable into the internal memory of a digital computer, characterized in that it comprises software code portions for performing claim 1 when said product is run on a computer.

15. The computer program product stored on a computer usable medium, characterized in that it comprises computer readable program means for causing a computer to perform claim 1 when said product is run on a computer.

16. A terminal for real-time betting, within a communications system comprising a distributed domain and a central domain, where the terminal belongs to the distributed domain, by handling electronic records that contain predictions of the outcome of a certain incident, is arranged to:
generate, within the distributed domain, an electronic record that contains a prediction of the outcome of the incident, according to a player's input,
furnish, within the distributed domain, the electronic record with a cryptographically protected proof of a certain moment of a distributed domain time associated with the generation of the electronic record,
characterized in that the terminal is further arranged to:
receive, within the distributed domain, repetitive beacon tick packets and watchdog tick packets, comprising time information of local time of the central domain at the moment the packet was sent,
synchronize local time of the distributed domain, with time equated with the central domain time information received by the beacon tick packets, by help of values of a counter in the terminal and time information in received beacon tick packets, and
verify validity of local time of the distributed domain regarding to the central domain's local time by comparing local time of the distributed domain to time information relating to the local time of the central domain received by the watchdog tick packets.

17. The terminal according to claim 16, characterized in that the terminal is, when synchronizing of local time of the distributed domain, arranged to:
receive, within the distributed domain, repetitive first and second beacon tick packets broadcasted by a predetermined time interval and read a value of the counter at the moment of receiving the first and second beacon tick packets, in order to create a conversion factor comparable to the interval of the first and second received beacon tick packets and to the values of the counter at the moments of receiving the first and second beacon tick packets,
send a request from the distributed domain to the central domain to send a response to indicate accurate central domain's local time at the moment of receiving the request and at the moment of sending the response,
initialize a clock indicating local time of the distributed domain ($t_0$),
receive the response from the central domain and read time information of the central domain's local time and a value of the counter at a moment of receiving the response, in order to construct a clock offset by computing an average delay between $t_1$ and $t_0$, and $t_2$ and $t_3$, and
update a new local time of the distributed domain essentially equating to the central domain's local time by adding to latest local time ($t_0$) of the distributed domain the clock offset and a value derived by multiplying with the conversion factor the difference of the values of the counter at the moment of receiving the response from the central domain and at the moment of sending the request to the central domain.

18. The terminal according to claim 16, characterized in that the terminal is an off-line terminal.

19. The terminal according to claim 16, characterized in that the terminal is arranged to compare delay of the next coming watchdog and/or beacon tick packet to delay information announced in the previous watchdog beacon tick packet, and accept only the watchdog and/or beacon tick packet if delay of the next coming watchdog and/or beacon tick packet is valid.

20. The terminal according to claim 16, characterized in that terminal is arranged to measure an interval from the player's input to latest to next beacon tick packet either in terms of counter values or of distributed domain's local time, and store it in a cryptographic form with the player's input to the electronic record.

21. The terminal according to claim 16, characterized in that terminal is arranged to use a value of the counter and/or an electric clock signal representing local time of the distributed domain at the said moment as an input in generating a cryptographically protected proof of a certain moment of a distributed domain.

22. The terminal according to claim 16, characterized in that the counter is a free running independent counter, and the terminal comprises more than one independent counter the rate of which are constant and independent of each other, and in that values of the first counter are used for internal log of events and returned to the central domain, and values of the second counter are used for time service of the distributed domain.

23. The terminal according to claim 16, characterized in that the terminal is arranged to read a value of the free running counter and store it in a memory means of the terminal for later user or verification, when at least one of the following event occurs: an information packet is received within the terminal, and the player makes an action, such as places his/her bet.

24. The terminal according to claim 16, characterized in that the terminal comprises a watchdog for performing functional steps of claim 1.

25. The terminal according to claim 24, characterized in that the watchdog is arranged to inform the central domain of values of the counter by sending information of counter values to the central domain.

26. The terminal according to claim 24, characterized in that the watchdog is performed within a protected integrated circuit.

27. The terminal according to claim 16, characterized in that the terminal comprises a data network access means for establishing two-way data link between the terminal and the central domain for bet record storage initialization and transferring broadcast parameters.

28. The terminal according to claim 16, characterized in that the terminal comprises a broadcast reception means for establishing one-way data link between the terminal and the central domain for transferring beacon tick packets and watchdog tick packets, watchdog key update packets, and bet start/end packets from central domain to the terminal.

29. The terminal according to claim 24, characterized in that the watchdog comprises also timing means being responsible for controlling that watchdog tick packets are received and that they are received at right time, and for adjusting local time of the terminal according to received data packets.

30. The terminal according to claim 24, characterized in that the watchdog comprises a communication protection means for encrypting and decrypting communication and checking signatures, storage key management means for creating and updating keys for storing data, such as placed bets, and storage entry generation means for encrypting and chaining entries, adding time-stamps and/or counter values to data, such as placed bets, and watchdog software means, which are responsible for authentication of a player, and processing of application data.

31. An organizer server for real-time betting, within a communications system comprising a distributed domain and a central domain, where the organizer server belongs to the central domain, by handling electronic records that contain predictions of the outcome of a certain incident, is arranged to:
receive from the distributed domain a multitude of electronic records that contain predictions of the outcome of the incident, and
process for finding out, after the outcome of the incident is known, which of the electronic records, if any, contain correct predictions of the outcome of the incident,
characterized in that the organizer server is further arranged to:
send repetitive beacon tick packets and watchdog tick packets, comprising time information of local time of the central domain at the moment the packet was sent, to the distributed domain, in order that local time of the distributed domain is synchronized with time equated with the central domain time information received by the beacon tick packets, by help of values of a counter in the distributed domain and time information in received beacon tick packets, and verify validity of local time of the distributed domain regarding to the central domain's local time by comparing local time of the distributed domain to time information relating to the local time of the central domain received by the watchdog tick packets.

32. The organizer server according to claim 31, characterized in that the organizer server, when synchronizing of local time of the distributed domain, is arranged to:
send repetitive first and second beacon tick packets in predetermined time interval to the distributed domain, in order to create, within the distributed domain, a conversion factor comparable to the interval of the first and second received beacon tick packets and to the values of the counter at the moments of receiving the first and second beacon tick packets within the distributed domain, and
respond to a request of the distributed domain to send a response to indicate accurate central domain's local time at the moment of receiving the request and at the moment of sending the response.

33. The organizer server according to claim 31, characterized in that the organizer server is arranged to wait a predetermined time interval announced in the previous beacon/watchdog tick packet, until send the next beacon/watchdog tick packet.

34. A computer implemented arrangement for real-time betting, comprising a distributed domain and a central domain, by handling electronic records that contain predictions of the outcome of a certain incident, is arranged to:
generate, with a processor and within the distributed domain, a multitude of electronic records that contain predictions of the outcome of the incident, according to a players' inputs,
furnish, within the distributed domain, each of the electronic records with a cryptographically protected proof of a certain moment of a distributed domain time associated with the generation of the electronic record,
characterized in that the arrangement is further arranged to:
receive, within the distributed domain, repetitive beacon tick packets and watchdog tick packets, comprising time information of local time of the central domain at the moment the packet was sent,
synchronize local time of the distributed domain, with time equated with the central domain time information received by the beacon tick packets, by help of values of a counter in the distributed domain and time information in received beacon tick packets, and
verify validity of local time of the distributed domain regarding to the central domain's local time by comparing local time of the distributed domain to time information relating to the local time of the central domain received by the watchdog tick packets.

35. The arrangement according to claim 34, characterized in that an information traffic between the central domain and distributed domain is encrypted.

36. The arrangement according to claim 34, characterized in that the arrangement comprises a two-way data link used for collecting bet records from the bet record storage within the distributed domain to the central domain.

37. The arrangement according to claim 34, characterized in that the arrangement comprises an one-way data link for transferring beacon tick packets and watchdog tick packets, watchdog key update packets, and bet start/end packets and results from central domain to the terminal within the distributed domain.

38. A circuit for real-time betting, within a communications system comprising a distributed domain and a central domain, where the circuit means belongs to the distributed domain, by handling electronic records that contain predictions of the outcome of a certain incident, is arranged to:
generate, within the distributed domain, an electronic record that contains a prediction of the outcome of the incident, according to a player's input, within the distributed domain, the electronic record with a cryptographically protected proof of a certain moment of a distributed domain time associated with the generation of the electronic record,
characterized in that the circuit is further arranged to:
receive, within the distributed domain, repetitive beacon tick packets and watchdog tick packets, comprising time information of local time of the central domain at the moment the packet was sent,
synchronize local time of the distributed domain, with time equated with the central domain time information received by the beacon tick packets, by help of values of a counter in the terminal and time information in received beacon tick packets, and
verify validity of local time of the distributed domain regarding to the central domain's local time by comparing local time of the distributed domain to time information relating to the local time of the central domain received by the watchdog tick packets.

* * * * *